No. 736,213. PATENTED AUG. 11, 1903.
F. B. CASE.
CONNECTION FOR THE SWINGING ELEMENTS OF CAMERAS.
APPLICATION FILED JAN. 17, 1903.
NO MODEL.
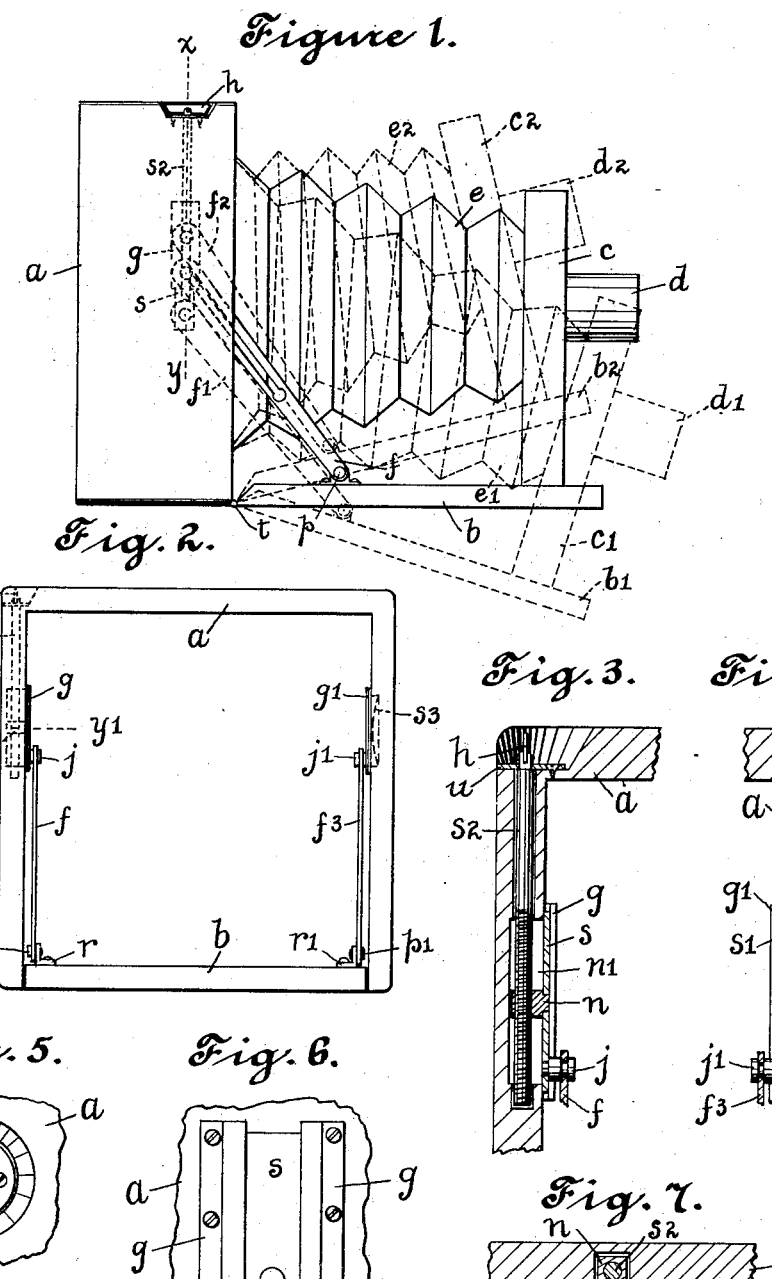
Witnesses
Albert C. Bell.
A. Pearl Moore.
Inventor
Frank B. Case.
By his Atty. Wm. H. Cooley.

No. 736,213. Patented August 11, 1903.

UNITED STATES PATENT OFFICE.

FRANK B. CASE, OF ROCHESTER, NEW YORK.

CONNECTION FOR THE SWINGING ELEMENTS OF CAMERAS.

SPECIFICATION forming part of Letters Patent No. 736,213, dated August 11, 1903.

Application filed January 17, 1903. Serial No. 139,454. (No model.)

*To all whom it may concern:*

Be it known that I, FRANK B. CASE, a citizen of the United States, and a resident of Rochester, in the county of Monroe and State of New York, have invented an Improved Connection for the Swinging Elements of Cameras, of which the following is a specification, reference being made to the accompanying drawings, in which—

Figure 1 is a side view of a camera in its opened position, showing the mechanism for adjusting the bed relatively to the back of such camera. Fig. 2 is a view from the right of the parts seen in Fig. 1, with the exception that the lens-standard $c$, lens $d$, and bellows $e$ are removed. Fig. 3 is an enlarged sectional view taken along the dotted line $x$ $y$ in Fig. 1 with all parts to the right of such line removed and shows only enough of that side of the camera-back $a$ toward the observer in Fig. 1 to clearly indicate the method of securing the pin $j$ to such camera-back and the adjusting of the same, while Fig. 4 is a similar sectional view taken in the same way along the same plane and shows only enough of the other side of the camera-back $a$ away from the observer in Fig. 1 to indicate the method of securing the pins $j'$ to such camera-back. Fig. 5 is a top view of the camera and shows the handle $h$ for adjusting the pin $j$. Fig. 6 is a face view of the slides $g$ $g$ as secured on the inside of the camera-back $a$. Fig. 7 is an enlarged sectional view taken along the dotted line $x'$ $y'$ in Fig. 2, with all parts above such line removed, and shows enough of the left-hand side of the camera-back $a$ as seen in Fig. 2 to indicate the method of securing the slide $s$ to such camera-back.

In folding cameras, as usually constructed with a swing-back, any adjustment that has been effected between the back and the bed has to be entirely disarranged by the closing of the camera. This has been one serious objection to the swing-back camera as usually constructed—that is, those of the folding type—and another objection has been found in that the adjustment is not usually locked—that is, the camera-back and the camera-bed are not locked in any position of adjustment, but they are moved to the desired adjustment and then afterward locked by separate screws or clamping devices especially for that purpose.

It is the purpose of my present invention to overcome these defects and provide a swing-back for a camera which shall make it possible to fold or close the camera without disturbing the angular adjustment between the camera-back and the camera-bed when they are again opened out into operative position, and one also in which the angular adjustment between the camera-bed and the camera-back is secured by means of a device which positively holds the parts in any desired position of adjustment without having to resort to the clamping-screw or other device for holding the parts when adjusted as desired.

Referring to the drawings, $a$ is the camera-back and $b$ the camera-bed, hinged thereto at $t$ in the usual way. The usual sliding brace $f$ is seen articulating at $p$ with a bracket $r$, secured to the bed $b$. A similar brace $f^3$, bracket $r'$, and pivot $p'$ are used on the side of the camera farthest from the observer in Fig. 1 and as indicated in Fig. 2. The upper ends of the braces $f f'$ normally articulate in the usual way and when desired may be made to slide by means of the usual slots therein upon the studs $j$ and $j'$, respectively, secured to the slides $s$ and $s'$, working in the guide-pieces $g$ $g'$, secured to the inside face of the camera-box $a$. A nut $n$ is secured upon the back face of the slide $s$, and through this nut $n$ there is arranged to work the threaded rod $s^2$ in such a way as to raise and lower this nut $n$ and the slide $s$, attached thereto, when this screw-rod $s^2$ is turned to the right or to the left by means of the handle $h$, secured to the top thereof. This screw-rod $s^2$ is prevented from moving up or down by being shouldered through the plate $u$, secured at the bottom of the conically-shaped recess in the top of the camera-back $a$ and near the side thereof toward the observer, as indicated in Fig. 1. The brace $f^3$ makes similar connection to that already indicated and described in regard to the brace $f$, with a stud $j'$ projecting inwardly from the slide $s'$. This slide $s'$, however, has no nut thereon, but is held in frictional engagement with its guides $g'$ (only one of which is seen) by means of the spring located in a recess therefor in the camera-back $a$ and behind such slide $s'$. Any one of the well-known devices for that purpose may be made use of for normally holding the braces $f$ and $f^3$ in such positions relatively to their corresponding studs $j$ and $j'$ that such studs are normally held in the upper ends of the slots in these braces $f$ and $f^3$ when once the camera has been opened until, as usual in folding cameras, the braces $f$ and $f^3$ are pushed downward to the rear for the purpose of folding up the camera. Such devices being well known in the art and forming no part of my present invention are not herein shown and no further reference is made thereto.

By the operation of the screw $h$ in the manner already described the camera-bed $b$ and the lens $d$ (shown only in outline) and the camera-front $c$ and the bellows $e$ may be forced to either one of the two extreme positions, down or up, as indicated, respectively, by the dotted lines at $b'$ $d'$ $c'$ $e'$ or $b^2$ $d^2$ $c^2$ $e^2$. The positions shown in the dotted lines, it will of course be understood, are extreme, never being reached in the practical operation of the camera; but within the normal operative range of the swing-back adjustment the camera may be closed and opened without disturbing the adjustment of the screw $s^2$ by means of the handle $h$, which serves not only to effect the desired adjustment; but when it is effected this adjustment is permanently retained until modified by again turning the handle $h$.

What I claim is—

1. In combination with a camera-back and a camera-bed hinged thereto, a brace articulating at one end with a bracket attached to one of such camera elements, and at its other end with a stud connected to a nut working upon a suitable screw carried by the other one of such camera elements, and a handle for operating such screw.

2. In combination with a camera-back and a camera-bed hinged thereto, a brace articulating at one end with a bracket attached to one of such camera elements, and at its other end with a stud connected to a nut working upon a suitable screw carried by the other one of such camera elements, and a handle for operating such screw accessible from the outside of the camera.

3. In combination with a camera-back and a camera-bed hinged thereto, a brace articulating at one end with a bracket attached to one of such camera elements, and at its other end with a stud connected to a nut working upon a suitable screw carried by the other one of such camera elements, a handle for operating such screw, and means for guiding and supporting such nut.

4. In combination with a camera-back and a camera-bed hinged thereto, a brace articulating at one end with a bracket attached to one of such camera elements, and at its other end with a stud connected to a nut working upon a suitable screw carried by the other one of such camera elements, a handle for operating such screw accessible from the outside of the camera, and means for guiding and supporting such nut.

5. In combination with a camera-back and a camera-bed hinged thereto, a brace articulating at one end with a bracket attached to one of such camera elements, and at its other end with a stud connected to a nut working upon a suitable screw carried by the other one of such camera elements, a handle for operating such screw, and a sliding connection between one end of such brace and the member with which that end thereof articulates.

6. In combination with a camera-back and a camera-bed hinged thereto, a brace articulating at one end with a bracket attached to one of such camera elements, and at its other with a stud connected to a nut working upon a suitable screw carried by the other one of such camera elements, a handle for operating such screw accessible from the outside of the camera, and a sliding connection between one end of such brace and the member with which that end thereof articulates.

7. In combination with a camera-back and a camera-bed hinged thereto, a brace articulating at one end with a bracket attached to one of such camera elements, and at its other end with a stud connected to a nut working upon a suitable screw carried by the other one of such camera elements, a handle for operating such screw, means for guiding and supporting such nut, and a sliding connection between one end of such brace and the member with which that end thereof articulates.

8. In combination with a camera-back and a camera-bed hinged thereto, a brace articulating at one end with a bracket attached to one of such camera elements, and at its other end with a stud connected to a nut working upon a suitable screw carried by the other one of such camera elements, a handle for operating such screw accessible from the outside of the camera, means for guiding and supporting such nut, and a sliding connection between one end of such brace and the member with which that end thereof articulates.

FRANK B. CASE.

Witnesses:
HERBERT LEARY,
A. PEARL MOORE.